US005325118A

United States Patent [19]

Zybin et al.

[11] Patent Number: 5,325,118

[45] Date of Patent: Jun. 28, 1994

[54] JET PRINTING HEAD

[76] Inventors: Kirill P. Zybin, Leningradskoe shosse, 13, kv. 104; Sergei N. Maximovsky, ulitsa Skakovaya, 34, korpus 4, kv. 235; Grigory A. Radutsky, ulitsa Pervomaiskaya, 66, kv. 45, all of, Moscow, U.S.S.R.

[21] Appl. No.: 613,633

[22] PCT Filed: Aug. 9, 1989

[86] PCT No.: PCT/SU89/00208

§ 371 Date: Nov. 26, 1990

§ 102(e) Date: Nov. 26, 1990

[87] PCT Pub. No.: WO90/11189

PCT Pub. Date: Oct. 4, 1990

[30] Foreign Application Priority Data

Mar. 23, 1989 [SU] U.S.S.R. .............................. 4661615

[51] Int. Cl.[5] .......................... G01D 15/18; B41J 2/06

[52] U.S. Cl. ...................................... 347/47; 400/126

[58] Field of Search .............. 346/140 R, 75; 400/126

[56] References Cited

U.S. PATENT DOCUMENTS

| | | | |
|---|---|---|---|
| 4,023,180 | 5/1977 | Zenner | 346/75 |
| 4,280,130 | 7/1981 | Slemmons | 346/75 |
| 4,354,197 | 10/1982 | Reitberger | 346/140 R |
| 4,463,676 | 8/1984 | Harada et al. | 101/212 |

*Primary Examiner*—Benjamin R. Fuller
*Assistant Examiner*—Eric Frahm
*Attorney, Agent, or Firm*—Keck, Mahin & Cate

[57] ABSTRACT

A jet printing head has a chamber for an inking liquid and a multilayer nozzle assembly for supplying liquid from the chamber to a data medium. The nozzles are arranged in parallel rows and lines. The nozzles in each row have a common electrode of one polarity and individual electrodes of opposite polarity. The individual electrodes for each line of nozzles are connected to a common bus. The buses for the respective lines are located in a plane parallel to the electrode plane with an interposed dielectric layer. The assembly includes a permanent magnet layer remote from the liquid chamber.

4 Claims, 1 Drawing Sheet

JET PRINTING HEAD

TECHNICAL FIELD

The present invention relates to printing devices and in particular to a jet printing head and a manufacturing method therefor.

BACKGROUND ART

A known jet printing head comprises a chamber suited to hold an inking liquid, one of its wall having nozzles uniformly disposed in rows and representing capillary holes. Each nozzle has a pair of electrodes separated by an insulating rod whose conical end faces the nozzle.

The nozzle also has a conical inlet and a cylindrical outlet connected therewith. As pulse voltage is applied to the electrodes, the liquid in the respective nozzles is instantaneously heated whereby a maximum pressure characteristic of pin-point microexplosions is produced at the cylindrical outlet of the nozzle. The inking liquid is discharged from the nozzle onto a data medium to make a corresponding record.

One of the disadvantages of such a structure is associated with unwanted complexities involved in production of a nozzle having conical and cylindrical sections which should be made to a high accuracy because even a slight deviation from preset parameters impairs geometry of a drop of inking liquid coming out of the nozzle, a factor adversely affecting printing quality. Likewise the insulating rods should meet stringent requirements for accuracy in production and installation. This calls for the use of precision equipment and skilled labour, which substantially increases the cost of such a printing facility. Furthermore, frequent drastic temperature changes in the liquid cause wear of the electrodes and the rod. Also, the liquid should be often changed due to its disintegration in heating.

There is further known a printing head with an electric means for supplying a conducting liquid dye staff to a data medium, which comprises an inking chamber with an assembly suited to supply said liquid dye staff and having a plurality of tubes of a sufficiently large diameter, said tubes being essentially capillary nozzles. The known printing head comprises a multitude of pairs of electrodes, each of which is fitted on diametrically opposite sides of the tubes at right angles to the tube axis, as well as a permanent C-magnet encompassing the head so that the magnetic field of the magnet passes through all the holes. On application of a voltage pulse to a pair of electrodes, they will pass current due to electric conduction of the liquid. As said current interacts with the field of the permanent magnet, there is produced an electrodynamic force ejecting a drop of inking liquid from the given capillary tube. Although a fairly small current passed through the electrodes does not cause their failure and disintegration of the inking liquid, the construction of the disclosed printing head is rather complicated due to the need for inserting the electrodes in the capillary tubes and aligning them in a precise manner relative to the tube axis. If the alignment is not exact, printing quality of drastically impaired. Moreover, it is practically impossible to connect the electrodes securely to current buses. Finally, a reliable discharge of drops of inking liquid from the head nozzles necessitates similar conditions for each capillary tube, that is, a similar magnetic field in the zone where the electrodes are positioned and similar strength of a current pulse flowing therethrough. In the case of a C-magnet the magnetic field in the centre is much weaker than that round the periphery, a factor substantially affecting printing quality due to impaired formation of drops of liquid discharged from the capillary tubes. Furthermore, the size of the C-magnet must exceed by many times the area occupied by the capillary tubes to obtain an essentially uniform field over the entire area of the printing head.

DISCLOSURE OF THE INVENTION

The object of the invention is to create a liquid supply assembly of a jet printing head, in which a relatively simple novel design would ensure similar magnetic intensity for each capillary tube in passing current pulses through electrodes thereof.

There is provided a jet printing head comprising a chamber holding a conducting liquid dye staff and an assembly suited to supply said liquid to a data medium and having rows of capillary nozzles and electrodes, in which, according to the invention, each row of nozzles has a common electrode of one polarity, while each nozzle in this group has an individual electrode of opposite polarity, all the electrodes being disposed in one plane at right angles to the nozzle axis. Said supply assembly is also provided with current buses of the individual electrodes, which are arranged in a plane parallel to the electrode plane, separated therefrom by a dielectric layer, oriented along lines crossing with the lines interconnecting the electrodes of each group at an angle of 90° and joined to the individual electrodes of the respective groups. A permanent magnet of such a group represents a magnetic layer arranged in a plane parallel to the plane containing said groups of the electrodes on the opposite side of the inking liquid.

Such a structure of the proposed printing head has a number of advantages, for example, similar design due to a smaller number of current leads (one bus for a row of nozzles) and better printing quality owing to more reliable ejection of drops from the nozzles, which is attributable to uniform intensity of the field set up by the magnetic layer. Furthermore, the printing head according to the invention allows manufacturing a supply assembly with a practically unlimited number of nozzles.

The proposed printing head is manufactured by forming a laminated structure with conducting and insulating layers arranged in rows and constituting electrodes and buses, and by subsequently cutting through capillary holes.

BRIEF DESCRIPTION OF THE DRAWINGS

The invention will now be described further with reference to a specified embodiment thereof, taken in conjunction with the accompanying drawings.

BEST MODE FOR CARRYING OUT THE INVENTION

Figure 1:
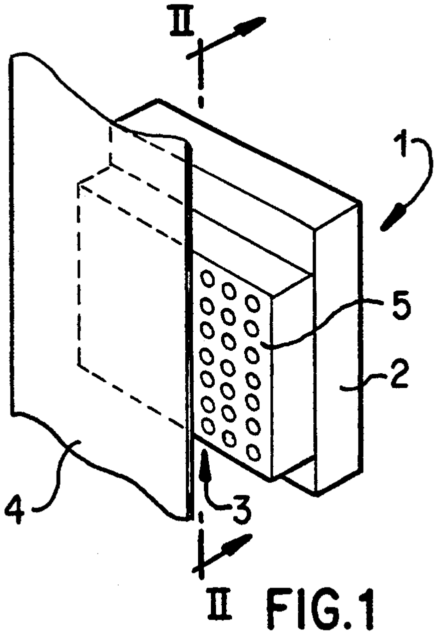
FIG. 1 is a general view of a jet printing head according to the invention.

Referring to FIG. 1 the proposed printing head designated as a whole with reference numeral 1 comprises a chamber 2 filled with a conducting liquid dye staff and an assembly 3 suited to supply the inking liquid to a data medium 4.

Figure 2:
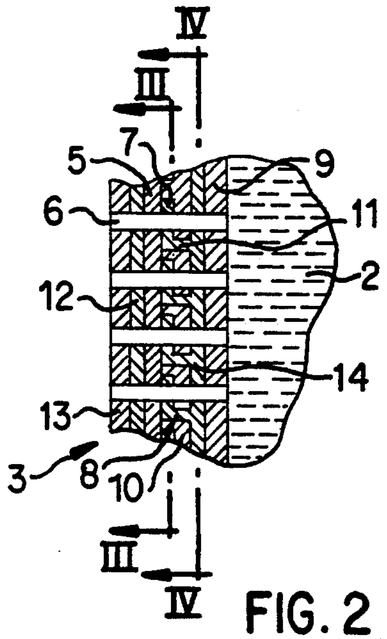
FIG. 2 is section II—II of FIG. 1.

The assembly 3 (FIG. 2) suited to supply the inking liquid is a multilayer structure formed on a base 5 and having through holes 6 which are in communication with the chamber 2. The holes 6 are disposed in rows along parallel lines, their axes bring perpendicular to the surface of the inking liquid. Each row of said holes has an electrode 7 common to all the holes in the given row, the total number of such common electrodes being equal to the number of rows of the holes 6. Said electrodes are made as buses arranged on the inner side of the base 5 facing the chamber 2. Moreover, each hole in said rows is provided with an individual electrode 8. The electrodes 8 are arranged in the same plane as the electrodes 7 at right angles to the axis containing the capillary holes 6 but on the diametrically opposite side of the holes in one row. Thus, all the electrodes are located on one side of the base 5 in the plane perpendicular to the hole axis and form one layer of the multilayer structure. The electrodes arranged in different rows are electrically insulated from one another. The individual electrodes 8 have current buses 9 located in a plane parallel to the plane containing the electrodes 8 and separated from said electrodes by a dielectric layer 10. The buses 9 are oriented along lines perpendicular to the electrodes 7, each busy being connected only with one individual electrode in different rows of said holes.

Figure 3:
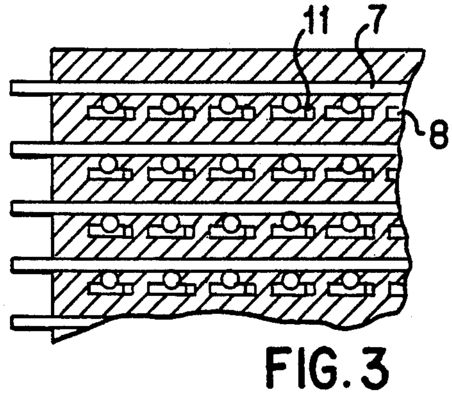
FIG. 3 is section III—III of FIG. 2.
Figure 4:
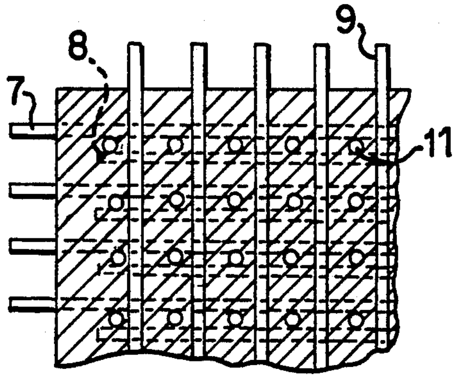
FIG. 4 is section IV—IV of FIG. 2.

So, as follows from FIGS. 3 and 4, the electrodes 7 and the buses of the electrodes 8 are arranged along mutually perpendicular crossing lines and separated by the dielectric layer 10.

Jumpers 11 for connecting the individual electrodes 8 to the buses 9 pass through the dielectric layer 10 parallel to the axes of the holes 6.

Arranged on the outer side of the base 5 opposite to the chamber 2 is a magnetic layer 12 protected with a film 13. An insulating layer 14 protects the multilayer structure on the opposite side.

The jet printing head according to the invention operates as follows.

As a voltage pulse is applied to one of the buses 7 and to one of the buses 9, the electrode circuit of the corresponding capillary hole 6 related to the given electrodes is closed. Current flowing through said circuit interacts with the magnetic field set up by the magnetic layer 12, due to which there is produced an electrodynamic force ejecting a drop of ink from the respective capillary hole 6, which is directed to the data medium 4.

The described jet printing head is manufactured as follows.

Applied to the base 5 of a suitable dielectric material on one side by any known techniques are parallel rows of continuous strips of a conducting material forming the electrodes 7 and discontinuous strips 8 forming individual electrodes, the distance between the applied continuous and discontinuous strips being somewhat smaller than the diameter of capillary holes.

The obtained one layer of the multilayer structure is topped with the insulating layer 10 to which the conducting layer 9 is applied, the latter layer representing continuous strips perpendicular to the strips forming the electrodes 7. Thereafter conducting jumpers are formed between the electrodes 8 and the strips of the layers 9. The formed structure is coated with the insulating layer 14. Next, on the opposite side of the base 5 there is formed the magnetic layer 12 topped with the protective film layer 13. Any known techniques will then be used to cut rows of holes in the obtained multilayer structure in the areas around the electrodes 7 and the individual electrodes 8, said holes passing partially through said electrodes. Then the supply assembly is joined to the chamber 2.

INDUSTRIAL APPLICABILITY

The jet printing head according to the invention allows contactless application of data to different media such as paper, film and the like. Thus, the invention can be used in printing arts and data-providing equipment for manufacturing alphanumeric printers.

We claim:

1. A jet printing head comprising a chamber for a conductive inking liquid and a nozzle assembly for supplying liquid from said chamber to a data medium, said nozzle assembly including a plurality of capillary nozzles. Communicating with said chamber, the nozzles each having an axis, each of said nozzles being parallel to each other along said axis and the nozzles being disposed in plural rows and in plural lines perpendicular to said rows, a plurality of first electrodes of one polarity, one of said first electrodes being associated with each of said nozzles in each of said rows, the first electrodes being located in a common plane perpendicular to said axes of said nozzles, a plurality of second electrodes one of said second electrodes for each of said being associated with each of said nozzles, the second electrodes being of opposite polarity to the first electrodes, the second electrodes being located in said common plane with the first electrodes, a plurality of parallel current supply buses, each of said buses connecting the second electrodes of a respective line of nozzles, the buses being located in a second plane parallel to said common plane and extending perpendicularly to the first electrodes, a dielectric layer between the first and second electrodes and the plurality of buses, and a permanent magnet layer in a further plane parallel to said common plane on one side of the first and second electrodes remote from said chamber.

2. A jet printing head as claimed in claim 1, wherein the second electrodes are connected to the plurality of current supply buses by jumpers extending through the dielectric layer.

3. A jet printing head as claimed in claim 1, wherein the magnet layer is provided with a protective film.

4. A jet printing head as claimed in claim 1, wherein the first electrodes comprise respective continuous strips of conducting material on one side of the respective nozzles in each of the rows, the second electrodes comprise respective discontinuous strips of conducting material on a diametrically opposite side of the respective nozzles in each of the rows, the current supply buses comprise respective continuous strips of conductive material, and wherein the nozzles comprise respective through-holes in said assembly partially cutting through the respective continuous strips of conductive material.

* * * * *